United States Patent
Morris

(10) Patent No.: US 8,914,625 B1
(45) Date of Patent: Dec. 16, 2014

(54) AUTOMATICALLY CONFIGURING A WEB BROWSER FILE WHEN BOOTING AN OPERATING SYSTEM FROM A DATA STORAGE DEVICE

(75) Inventor: James Dean Morris, Newport Coast, CA (US)

(73) Assignee: Western Digital Technologies, Inc., Irvine, CA (US)

(*) Notice: Subject to any disclaimer, the term of this patent is extended or adjusted under 35 U.S.C. 154(b) by 631 days.

(21) Appl. No.: 12/534,083

(22) Filed: Jul. 31, 2009

(51) Int. Cl.
*G06F 15/177* (2006.01)

(52) U.S. Cl.
USPC .................................. 713/2; 713/1; 713/100

(58) Field of Classification Search
USPC ................................................. 713/1, 2, 100
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |

(Continued)

OTHER PUBLICATIONS

U.S. Appl. No. 12/534,076, filed Jul. 31, 2009, 10 pages.

(Continued)

*Primary Examiner* — Dennis M Butler

(57) ABSTRACT

A data storage device is disclosed comprising a non-volatile memory having a host operating system stored in an unprotected area of the non-volatile memory, a device operating system stored in a protected area of the non-volatile memory, and a device application operable to modify a web browser file, the device application stored in the protected area of the non-volatile memory. When a first read command is received from a host to load the host operating system, the device operating system is returned in response to the first read command. A second read command is then received from the host to load the device application, and a write command is received from the device application executing on the host to modify the web browser file.

16 Claims, 8 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,113 B1 * | 2/2004 | Harrison et al. ............ 1/1 |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,963,901 B1 | 11/2005 | Bates et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 6,999,913 B2 | 2/2006 | Hensley |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |

(56) References Cited

U.S. PATENT DOCUMENTS

| | | |
|---|---|---|
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,506,335 B1 | 3/2009 | Woolf et al. |
| 7,518,819 B1 | 4/2009 | Yu et al. |
| 7,526,184 B1 | 4/2009 | Parkinen et al. |
| 7,526,762 B1 | 4/2009 | Astala et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |

(56) References Cited

U.S. PATENT DOCUMENTS

| | | |
|---|---|---|
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 2002/0078192 A1 | 6/2002 | Kopsell et al. |
| 2002/0143770 A1 | 10/2002 | Schran et al. |
| 2003/0046371 A1 | 3/2003 | Falkner |
| 2004/0015580 A1 | 1/2004 | Lu et al. |
| 2007/0168493 A1* | 7/2007 | Sarwono et al. ............... 709/224 |
| 2008/0005460 A1 | 1/2008 | Uemura |
| 2009/0063656 A1 | 3/2009 | Blumenau et al. |
| 2009/0113702 A1 | 5/2009 | Hogg |
| 2009/0198987 A1* | 8/2009 | Sumioka et al. .................. 713/1 |
| 2009/0287705 A1* | 11/2009 | Schneider ......................... 707/9 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Office Action dated Nov. 1, 2012 from U.S. Appl. No. 12/534,076, 23 pages.

Office Action dated Apr. 11, 2013 from U.S. Appl. No. 12/534,076, 20 pages.

Advisory Action dated Jun. 24, 2013 from U.S. Appl. No. 12/534,076, 4 pages.

Office Action dated Feb. 5, 2013 from U.S. Appl. No. 12/534,076, 3 pages.

Office Action dated Jul. 18, 2013 from U.S. Appl. No. 12/534,076, 20 pages.

Office Action dated Jan. 16, 2014 from U.S. Appl. No. 12/534,076, 19 pages.

Examiners Answer to Appeal Brief dated Jul. 7, 2014 from U.S. Appl. No. 12/534,076, 10 pages.

* cited by examiner

AUTOMATICALLY CONFIGURING A WEB BROWSER FILE WHEN BOOTING AN OPERATING SYSTEM FROM A DATA STORAGE DEVICE

BACKGROUND

Description of the Related Art

Computer systems (e.g., desktops, laptops, portables, etc) typically employ some form of a non-volatile data storage device such as a disk drive, or a solid state drive comprising a non-volatile semiconductor memory such as flash memory. A solid state drive typically emulates a disk drive so that the same communication protocol may be employed. That is, a host typically interfaces with a solid state drive using a standard disk drive communication protocol, such as the Advanced Technology Attachment (ATA) protocol.

Computer systems typically allow access to the Internet using a standard web browser (Internet Explorer, Safari, Firefox, etc.) and therefore have become significant platforms for consumer transactions and advertising. Web browsers store information in configuration files that help facilitate browsing sessions. For example, a website may store a cookie in a browser cookie file, wherein the cookie may include information for authentication and session tracking (state maintenance), or specific information about a user, such as site preferences or the contents of their shopping cart. Each time the user visits a particular website, or browses through different pages of a website, the corresponding cookie information may be transmitted to the website to facilitate the browsing session.

DETAILED DESCRIPTION OF EMBODIMENTS OF THE INVENTION

Figures 1A, 1B, 1C:
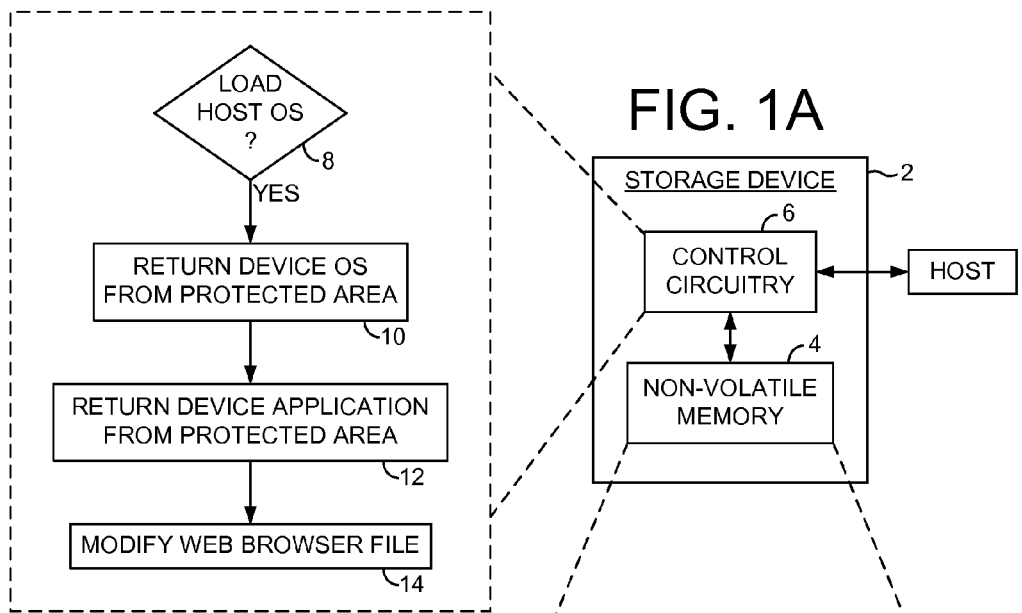
FIG. 1A shows a data storage device according to an embodiment of the present invention comprising a non-volatile memory and control circuitry.
FIG. 1B shows an embodiment wherein the non-volatile memory stores a device operating system and a device application in a protected area inaccessible by the host, and stores a host operating system and browser application in an unprotected area accessible by the host.
FIG. 1C is a flow diagram executed by the control circuitry according to an embodiment of the present invention wherein when the host requests the host operating system, the storage device returns the device operating system which loads and executes the device application in order to modify a web browser file.

FIG. 1A shows a data storage device 2 comprising a non-volatile memory 4 having a host operating system stored in an unprotected area of the non-volatile memory, a device operating system stored in a protected area of the non-volatile memory, and a device application operable to modify a web browser file, the device application stored in the protected area of the non-volatile memory (FIG. 1B). The data storage device further comprises control circuitry 6 for executing the flow diagram of FIG. 1C. When a first read command is received from a host to load the host operating system (step 8), the device operating system is returned in response to the first read command (step 10). A second read command is then received from the host to load the device application (step 12), and a write command is received from the device application executing on the host to modify the web browser file (step 14).

In the embodiment of FIG. 1B, the protected area of the non-volatile memory is inaccessible by the host that boots the host operating system. In this manner, the device operating system and the device application are protected from being modified or disabled by the host. Any suitable technique may be employed to reserve the protected area in the non-volatile memory, such as by reserving a number of data locations and corresponding block addresses for internal use only.

Any suitable technique may be employed to return the device operating system instead of the host operating system during the initial boot operation of the data storage device. Suitable techniques are disclosed in U.S. Pat. No. 6,948,165 entitled "METHOD FOR INSTALLING AN APPLICATION PROGRAM TO BE EXECUTED DURING EACH BOOTLOAD OF A COMPUTER SYSTEM FOR PRESENTING A USER WITH CONTENT OPTIONS PRIOR TO CONVENTIONAL SYSTEM STARTUP PRESENTATION WITHOUT REQUIRING A USER'S PARTICIPATION TO INSTALL THE PROGRAM" the disclosure of which is incorporated herein by reference.

Figure 2A:
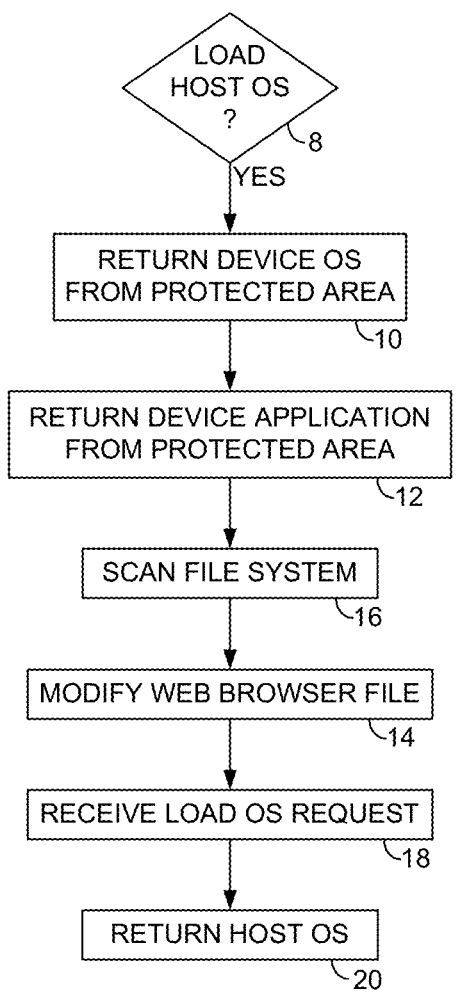
FIG. 2A is a flow diagram according to an embodiment of the present invention wherein the device application scans the file system in the host operating system to find and modify the web browser file.

FIG. 2A is a flow diagram according to an embodiment of the present invention which extends on the flow diagram of FIG. 1C. When the device operating system executes the device application, the device application scans the file system of the host operating system (step 16) in order to locate and modify the target web browser file (step 14). After modifying the web browser file, the device application generates a reboot command to reboot the host so that the host resends a request to load the host operating system (step 18) wherein the data storage device returns the host operating system (step 20). After the host operating system is loaded, the host operates normally including to execute the web browser application using the modified web browser file.

Figure 2B:
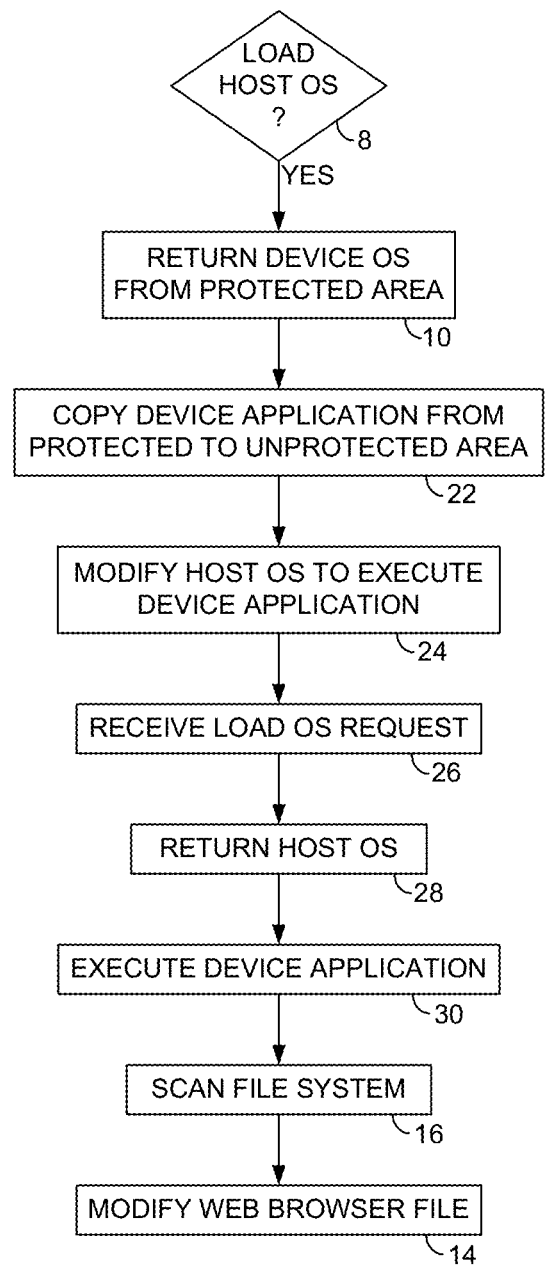
FIG. 2B is a flow diagram according to an embodiment of the present invention wherein the device operating system copies the device application into the unprotected area of the non-volatile memory and modifies the host operating system so that the device application is executed during the boot process.

The device application may be executed in any suitable manner during the boot of the host. FIG. 2B is a flow diagram according to an embodiment of the present invention wherein while executing the device operating system (step 10) the device application is copied from the protected area of the non-volatile memory to the unprotected area (step 22). The host operating system is then modified (step 24) so that the device application is executed automatically when the host operating system is loaded and executed. For example, the device application (or alias) may be copied into a startup folder of the host operating system. The device operating system then generates a reboot command to reboot the host so that the host resends a request to load the host operating system (step 26). The data storage device returns the host operating system (step 28) which then executes the device application (step 30) which scans the file system (step 16) and modifies a target web browser file (step 14).

Figure 3A:
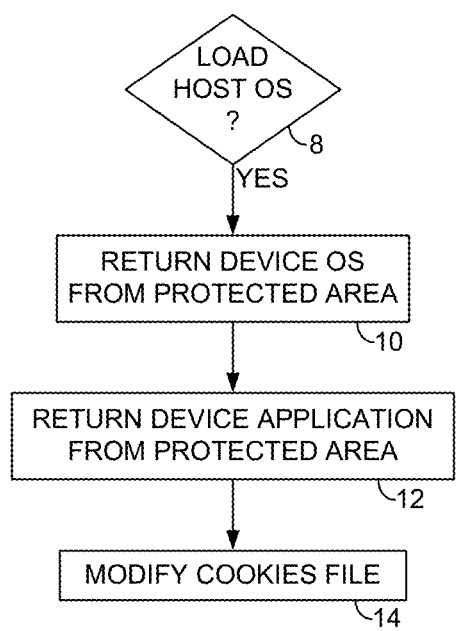
FIG. 3A is a flow diagram according to an embodiment of the present invention wherein the web browser file modified by the device application comprises a cookies file.

In the embodiments of the present invention, any suitable web browser file may be modified for any suitable web browser (Internet Explorer, Netscape, Safari, Firefox, etc.). FIG. 3A shows an embodiment of the present invention wherein the web browser file comprises a cookies file (step 14). In one embodiment, the cookies file stores cookies generated by various Internet websites, wherein the cookies may include information for authentication and session tracking (state maintenance), or specific information about a user, such as site preferences or the contents of their shopping cart. Each time the user visits a particular website, or browses through different pages of a website, the corresponding cookie information may be transmitted to the website to facilitate the browsing session. The device application may make any suitable modification to the cookies stored in the cookies file during each boot of the host, such as erasing one or more of the cookies.

Figure 3B:
FIG. 3B shows a web browser window for configuring a list of websites that are blocked from storing cookies on the host system.
Figure 3C:
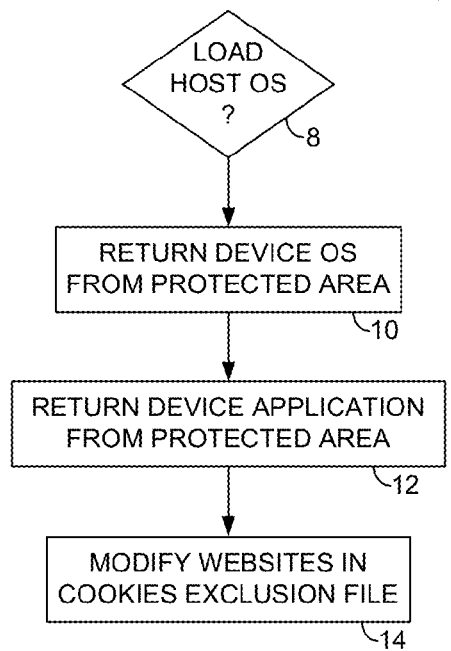
FIG. 3C is a flow diagram according to an embodiment of the present invention wherein the device application modifies the cookies exclusion file.

FIG. 3B shows a dialog window displayed from a web browser for enabling/disabling cookies for selected websites. For example, if a user wants to block all cookies generated by a particular website, the user enters the address of the website and selects the "Block" button which adds the website address to the list of blocked websites. The list of website addresses and access setting is typically stored in a cookies exclusion file (a configuration file) for the web browser. FIG. 3C is a flow diagram according to an embodiment of the present invention wherein the web browser file modified by the device application comprises the cookies exclusion file (step 14). For example, the device application may add a number of website addresses to the cookies exclusion file so that the corresponding websites are blocked from using cookies, or allowed to use cookies when viewed with the web browser.

Figure 3D:
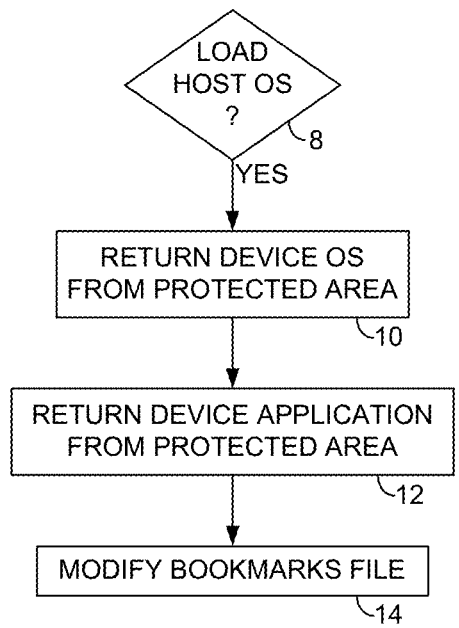
FIG. 3D is a flow diagram according to an embodiment of the present invention wherein the device application modifies a bookmarks file.

FIG. 3D shows an embodiment of the present invention wherein the device application modifies a bookmarks file of the web browser (step 14). A bookmarks file stores a list of website addresses for quick access by the user during Internet browsing sessions. The bookmarks may be displayed in any suitable manner, such as in a drop-down menu or in a toolbar of the web browser. In one embodiment, the device application deletes or adds websites from the bookmarks file so that it is configured into a desired state.

Figure 3E:
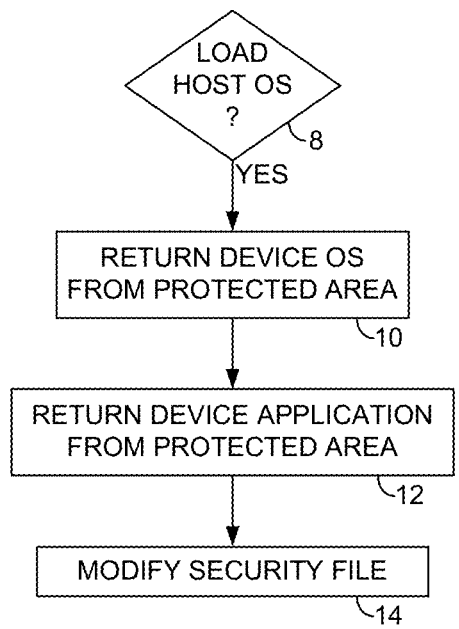
FIG. 3E is a flow diagram according to an embodiment of the present invention wherein the device application modifies a security file.

FIG. 3E shows an embodiment of the present invention wherein the device application modifies a security file of the web browser (step 14). The security file may store configuration information for enabling/disabling certain security features of a web browser, such as enabling/disabling various program components (e.g., Java, .NET, ActiveX, etc.) that a website may attempt to download and run on the host computer together with the standard HTML scripts. Alternatively, the security file may store security certificates which enable secure communication between a website and the web browser over the Internet. In one embodiment, the security file comprises a list of websites having a particular security configuration. The device application may modify the security file in any suitable manner, such as reconfiguring the security file, deleting or modifying security certificates, adding/deleting websites from a list of trusted websites, etc.

Figure 3F:
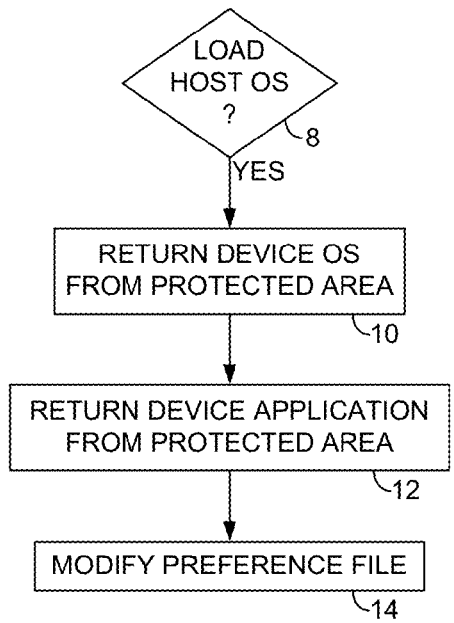
FIG. 3F is a flow diagram according to an embodiment of the present invention wherein the device application modifies a preference file.

FIG. 3F shows an embodiment of the present invention wherein the device application modifies a preference file of the web browser (step 14). The preference file may store configuration information, such as the address of a website displayed initially (the homepage) when the web browser is first launched. In one embodiment, the device application modifies the homepage in the configuration file so that the web browser is forced to visit the corresponding website at least once after each boot of the host operating system.

Figure 4:
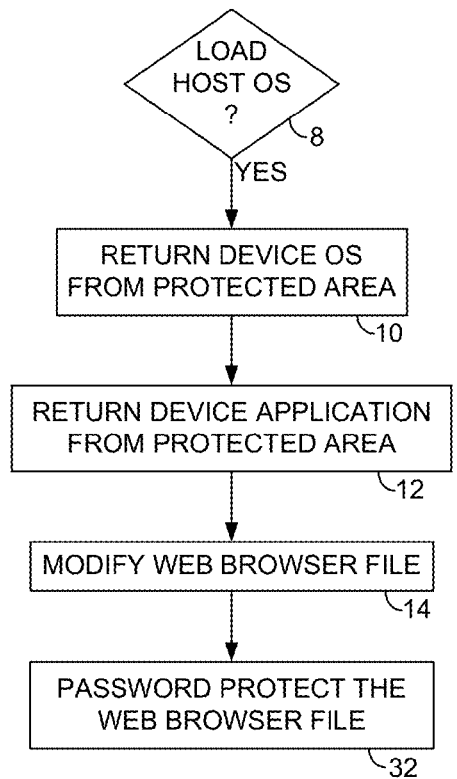
FIG. 4 is a flow diagram according to an embodiment of the present invention wherein the device application password protects the modifications made to the web browser file.

FIG. 4 is a flow diagram according to an embodiment of the present invention wherein the modified web browser file is password protected by the device application (step 32) to prevent a user from reversing the changes. In one embodiment, the web browser file is continuously monitored by the device application running in the background to ensure the modifications are not reversed. In another embodiment, the device application configures the data storage device to monitor the web browser file and ensure any attempted change to the file does not reverse the modifications made by the device application. For example, the device application may identify certain storage locations in the non-volatile memory (e.g., logical blocks) that store the modified web browser file. If the host attempts to modify these storage locations (by writing to the web browser file), the data storage device filters the access requests to ensure the web browser file maintains the desired state as configured by the device application. In one embodiment, changes to the web browser file are allowed if the access request includes the authenticating password. For example, an authenticated web server accessed over the Internet may be allowed to configure the web browser file into a new state, such as by enabling cookies for a particular website.

Figure 5:
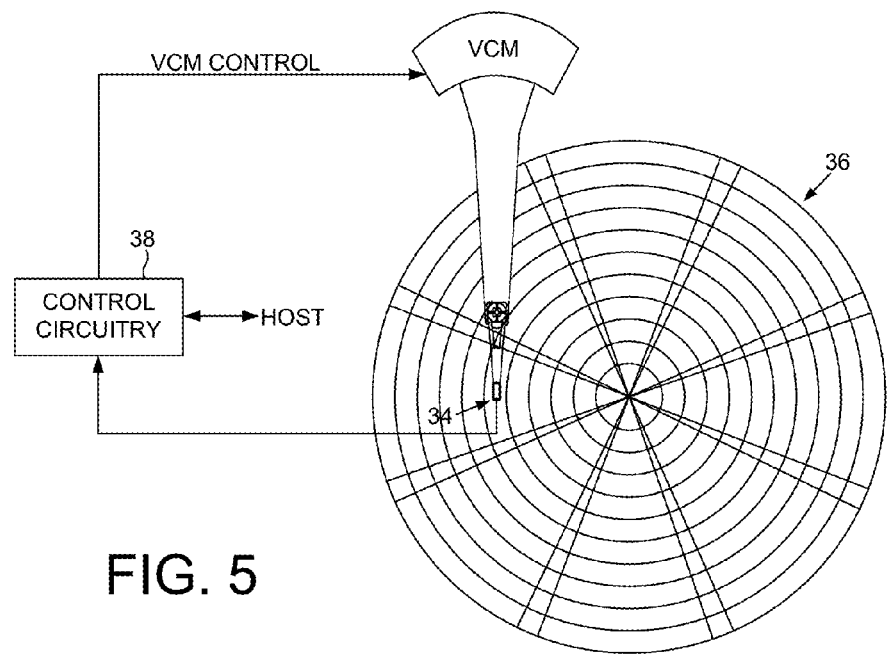
FIG. 5 shows an embodiment wherein the data storage device comprises a disk drive.
Figure 6:
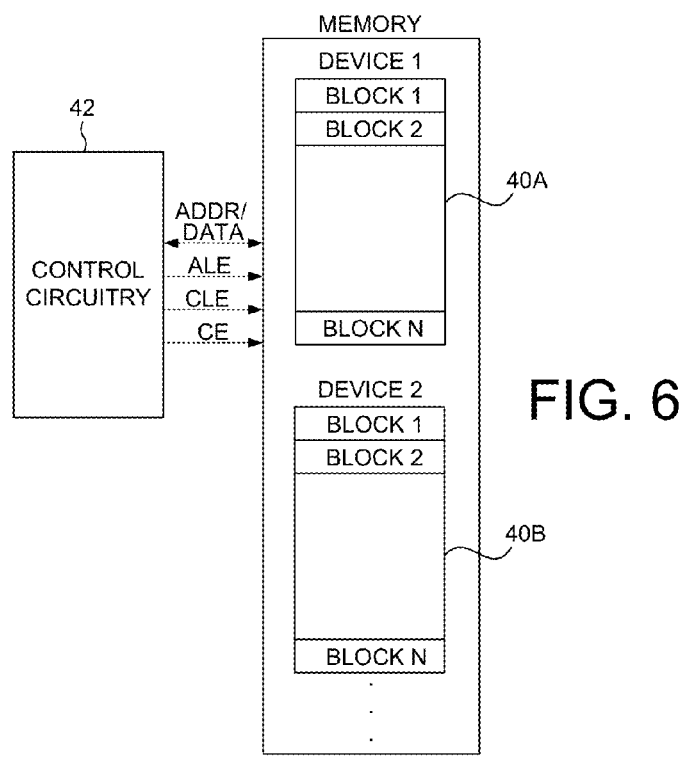
FIG. 6 shows an embodiment wherein the data storage device comprises a solid state drive.

The embodiments of the present invention may be employed in any suitable data storage device. FIG. 5 shows a data storage device comprising a disk drive including a head 34 actuated over a disk 36 and control circuitry 38 for executing the flow diagrams described herein. FIG. 6 shows a solid state drive comprising a plurality of non-volatile semiconductor memories 40A, 40B, etc., such as flash memories, and control circuitry 42 for executing the flow diagrams described herein. A hybrid data storage device may also be employed comprising components of a disk drive shown in FIG. 5 combined with the non-volatile semiconductor memories shown in FIG. 6.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are read into a volatile semiconductor memory when the data storage device is powered on. In yet another embodiment, the control circuitry comprises suitable logic circuitry, such as state machine circuitry.

What is claimed is:

1. A data storage device comprising:
    a non-volatile memory comprising:
        a host operating system stored in an unprotected area of the non-volatile memory;
        a device operating system stored in a protected area of the non-volatile memory; and
        a device application operable to modify a web browser file of a web browser independent of a user of the web browser, the device application stored in the protected area of the non-volatile memory;
    control circuitry operable to:
        receive a first read command from a host to load the host operating system;
        return the device operating system in response to the first read command;
        receive a second read command from the host to load the device application; and
        receive a write command from the device application loaded on the host to modify the web browser file.

2. The data storage device as recited in claim 1, wherein:
    the host operating system comprises a file system including the web browser file; and
    the device application is operable to scan the file system to find the web browser file.

3. The data storage device as recited in claim 1, wherein the web browser file comprises a cookies file.

4. The data storage device as recited in claim 1, wherein the web browser file comprises a website list for storing websites excluded from storing cookies at the host.

5. The data storage device as recited in claim 4, wherein the device application is operable to add a plurality of website names to the website list.

6. The data storage device as recited in claim 1, wherein the web browser file comprises a bookmarks file.

7. The data storage device as recited in claim 1, wherein the web browser file comprises a security file.

8. The data storage device as recited in claim 1, wherein the web browser file comprises a preference file.

9. The data storage device as recited in claim 1, wherein the device application is operable to password protect the modified web browser file.

10. A method of operating a data storage device, the data storage device comprising a non-volatile memory comprising:
    a host operating system stored in an unprotected area of the non-volatile memory;
    a device operating system stored in a protected area of the non-volatile memory; and
    a device application operable to modify a web browser file of a web browser independent of a user of the web browser, the device application stored in the protected area of the non-volatile memory;
the method comprising:
    receiving a first read command from a host to load the host operating system;
    returning the device operating system in response to the first read command;
    receiving a second read command from the host to load the device application; and
    receiving a write command from the device application loaded on the host to modify the web browser file.

11. The method as recited in claim 10, wherein:
    the host operating system comprises a file system including the web browser file; and
    the device application is operable to scan the file system to find the web browser file.

12. The method as recited in claim 10, wherein the web browser file comprises a cookies file.

13. The method as recited in claim 10, wherein the web browser file comprises a bookmarks file.

14. The method as recited in claim 10, wherein the web browser file comprises a security file.

15. The method as recited in claim 10, wherein the web browser file comprises a preference file.

16. The method as recited in claim 10, wherein the device application is operable to password protect the modified web browser file.

* * * * *